United States Patent
Kaneda et al.

(10) Patent No.: US 9,451,758 B2
(45) Date of Patent: Sep. 27, 2016

(54) BOX TYPE PET DRYER

(71) Applicant: DREAM INDUSTRY Co., Ltd., Wakayama-shi, Wakayama (JP)

(72) Inventors: Takashi Kaneda, Wakayama (JP); Mitsuhiro Kaneda, Wakayama (JP); Norio Saeki, Iwade (JP)

(73) Assignee: DREAM INDUSTRY Co., Ltd., Wakayama-shi (JP)

( * ) Notice: Subject to any disclaimer, the term of this patent is extended or adjusted under 35 U.S.C. 154(b) by 113 days.

(21) Appl. No.: 14/405,147

(22) PCT Filed: Jun. 19, 2014

(86) PCT No.: PCT/JP2014/066339
§ 371 (c)(1),
(2) Date: Dec. 2, 2014

(87) PCT Pub. No.: WO2015/037300
PCT Pub. Date: Mar. 19, 2015

(65) Prior Publication Data
US 2015/0327512 A1 Nov. 19, 2015

(30) Foreign Application Priority Data
Sep. 14, 2013 (JP) .............................. 2013-191231

(51) Int. Cl.
*A01K 13/00* (2006.01)

(52) U.S. Cl.
CPC .................................. *A01K 13/001* (2013.01)

(58) Field of Classification Search
CPC ........ F26B 21/08; F26B 21/10; F26B 21/12; F26B 25/06; F26B 25/14; A01K 13/00; A01K 13/001
USPC ....... 119/600, 601, 606, 650, 668, 677, 678; 4/535, 536
See application file for complete search history.

(56) References Cited

U.S. PATENT DOCUMENTS

| | | | | | |
|---|---|---|---|---|---|
| 157,846 | A | * | 12/1874 | Leslie | ................................ 4/536 |
| 990,126 | A | * | 4/1911 | Graefe | ................. A01K 13/003 |
| | | | | | 119/678 |
| 1,258,763 | A | * | 3/1918 | Girvin | ................. A01K 13/001 |
| | | | | | 119/650 |
| 1,335,629 | A | * | 3/1920 | Woudema | ........... A01M 13/003 |
| | | | | | 119/678 |
| 1,714,635 | A | * | 5/1929 | Schafer | .................... A61D 7/00 |
| | | | | | 119/678 |

(Continued)

FOREIGN PATENT DOCUMENTS

| | | |
|---|---|---|
| JP | 3165766 U | 2/2011 |
| JP | 3166426 U | 3/2011 |

*Primary Examiner* — Joshua J Michener
*Assistant Examiner* — Devin Barnett
(74) *Attorney, Agent, or Firm* — Alleman Hall McCoy Russell & Tuttle LLP (57) ABSTRACT

A box-type pet dryer is provided, by using a unitization and modularization technique of an electric control device and a casing. An electric control device has a function to adjust air volume and temperature by a temperature sensor and controls a rotational speed of a fan motor by a humidity sensor. A partition plate is provided to divide between the electric control device and a side opening part of the casing A filtered window is attached to the partition plate, and a warm air discharge port is formed in a lower part of the partition plate. A door is attached to a front surface of the casing, and a side plate is attached to a side surface opposite from the side opening part. The pet dryer is configured to be easily assemblable and disassemblable by coupling the electric control device and the casing at the side opening part.

11 Claims, 8 Drawing Sheets

(56) References Cited

U.S. PATENT DOCUMENTS

| | | | | |
|---|---|---|---|---|
| 3,927,642 A * | 12/1975 | Levin | ............ | A01K 41/00 119/300 |
| 3,985,102 A * | 10/1976 | Yonezawa | ............ | A01K 13/001 119/416 |
| 4,183,323 A * | 1/1980 | Maines | ............ | A01K 13/001 119/416 |
| 4,184,454 A * | 1/1980 | Nagao | ............ | A01K 13/003 119/678 |
| 4,559,903 A * | 12/1985 | Bloom | ............ | A01K 13/001 119/416 |
| 4,947,799 A * | 8/1990 | Parker | ............ | A01K 13/001 119/606 |
| 5,025,572 A * | 6/1991 | Cordier | ............ | A01K 13/001 34/201 |
| 5,133,579 A * | 7/1992 | Anderson | ............ | D06F 58/20 285/226 |
| 5,213,059 A * | 5/1993 | Krantz | ............ | A01K 1/031 119/419 |
| 5,285,907 A * | 2/1994 | Franchere | ............ | A47B 87/00 211/194 |
| 5,289,799 A * | 3/1994 | Wilson | ............ | A01K 1/0117 119/164 |
| 5,394,621 A * | 3/1995 | Levy | ............ | F26B 21/008 223/69 |
| 5,435,269 A * | 7/1995 | Chen | ............ | A01K 15/027 119/668 |
| 5,448,966 A * | 9/1995 | McKinnon | ............ | A61D 11/00 119/676 |
| 5,601,636 A * | 2/1997 | Glucksman | ............ | F24F 3/1603 55/356 |
| 6,058,886 A * | 5/2000 | Haines | ............ | A01K 13/001 119/601 |
| 6,230,656 B1 * | 5/2001 | Walach | ............ | A01K 1/0236 119/453 |
| 6,318,295 B1 * | 11/2001 | Wade | ............ | A01K 1/03 119/421 |
| 6,425,347 B1 * | 7/2002 | Bogner | ............ | A61D 3/00 119/315 |
| 6,435,136 B1 * | 8/2002 | Segura Munoz | ............ | A01K 13/001 119/650 |
| 7,011,046 B1 * | 3/2006 | Kidwell | ............ | A01K 1/0047 119/657 |
| 7,100,538 B2 * | 9/2006 | Motomura | ............ | A01K 13/001 119/604 |
| 7,316,080 B1 * | 1/2008 | Woolsey | ............ | F26B 17/04 34/207 |
| 7,497,188 B2 * | 3/2009 | Cho | ............ | A01K 13/001 119/604 |
| 7,975,652 B2 * | 7/2011 | Denison | ............ | A01K 13/001 119/448 |
| 8,061,304 B1 * | 11/2011 | Ramsay | ............ | A01K 13/001 119/671 |
| 8,561,574 B2 * | 10/2013 | Tchekneva | ............ | A01K 1/031 119/417 |
| 8,869,420 B1 * | 10/2014 | Nazhad | ............ | F26B 21/08 110/342 |
| 9,140,492 B1 * | 9/2015 | Gunsaullus | ............ | F26B 5/00 |
| 2004/0025365 A1 * | 2/2004 | Jewell | ............ | F26B 9/003 34/218 |
| 2006/0076261 A1 * | 4/2006 | Kurtenbach | ............ | A47B 87/0292 206/511 |
| 2007/0245975 A1 * | 10/2007 | Udelle | ............ | A01K 13/002 119/600 |
| 2008/0053379 A1 * | 3/2008 | Markewitz | ............ | A01K 13/00 119/600 |
| 2008/0190375 A1 * | 8/2008 | German | ............ | A01K 13/001 119/606 |
| 2009/0173286 A1 * | 7/2009 | Schetlin | ............ | A01K 13/001 119/606 |
| 2012/0037085 A1 * | 2/2012 | Caisse | ............ | A01K 13/001 119/676 |
| 2012/0048209 A1 * | 3/2012 | Tarbutton | ............ | A01K 13/001 119/673 |
| 2014/0212304 A1 * | 7/2014 | Michael | ............ | F04D 25/082 417/363 |

\* cited by examiner

BOX TYPE PET DRYER

TECHNICAL FIELD

The present invention relates to a box-type pet dryer, which is reduced in cost and easy to assemble by unitization of an electric control device and a casing, and by modularization of the casing.

BACKGROUND ART

Conventional box-type pet dryers have a structure in which a casing and an electric control device part are formed integrally and they are together incorporated in the dryers. Those box-type pet dryers have been manufactured for small, medium and large-sized dogs, respectively. Because of the integrally incorporation, if a failure occurs at customers, the customers have to ship back the entire dryers. Therefore, there is a disadvantage that large cost is required for the shipping. Further, when customers want to extend the box-type pet dryers after purchasing them, there are inconveniences, such as requiring large cost because they need to purchase new products.

In order to speed up the drying, when the inside of the casing is heated by a heater to raise the temperature up to around 40° C., since the conventional casing is made of metal, there is an inconvenience that heat dissipation from the casing surface is large and, thus, requiring more power. In addition, the room temperature increases by the heat dissipation from the casing, and more power is required for cooling.

Conventionally, the drying is achieved by heat and wind; however, the drying performance is reduced by an increase in humidity inside the casing. Thus, a predetermined gap is provided in a front door or the like, and external air is taken in from a lower part while exhausting warm air from an upper part. This induces further unnecessary power consumption, and dispersion of hair of animals in the room, which is originally dispersed inside the casing. Therefore, this circumstance is not good for health of trimmers of pets.

In a conventional box-type dryer for large-sized dogs, a partition plate can be inserted into an intermediate part of the casing in order to simultaneously dry two dogs, a small-sized dog and a medium-sized dog. However, when the partition plate is not necessary, the partition plate causes a trouble of its storage space.

The dryer has a structure in which a duckboard is provided in a lower part of storage to separate a dog from excrement, and warm air is blown into the casing. Thus, it is easy to dry near the blowing side of warm air, but the drying is slower at the opposite location. Therefore, the drying is not uniform in the case of the large-sized dog, and it takes more time to finish the drying. Same problem is also caused when simultaneously drying a small-sized dog and a medium-sized dog (the term "drying" as used herein for the box-type dryer refers to a half dry state, and hair setting cannot be done if the hair is dried too much).

In the meantime, the following invention is proposed for a box-type pet dryer in which a casing is foldable and it can be stored compactly.

Japanese Utility Model Registration No. 3165766 (Patent Document 1) has proposes of providing a "box-type pet dryer" which is comparatively small in volume, can be disassembled without tools, and is safe. The proposed pet dryer is characterized by including a first plate body, an upper frame, two side plates, a lower frame, two forward lever bodies, and a door plate. The first plate body is provided with an upper connecting lever and a lower connecting lever so as to protrude, and the upper frame is rotatably connected with the upper connecting lever of the first plate body. A ceiling plate is provided, and a dryer is provided on the surface of the ceiling plate. The two side plates are pivotably connected with the first plate body with hinges. The lower frame is rotatably connected with the lower connecting lever of the first plate body, and the two forward levers are rotatably connected with front ends of the lower frame and the upper frame. The door plate is pivotably connected with a front surface of the upper frame with hinges.

However, the box-type pet dryer has a purpose to be mainly used for specific domestic pets. Thus, the pet dryer is not suitable for business use in simultaneously drying two dogs, a small-sized dog and a medium-sized dog, and the utility model registration does not disclose a structure for extending from a dryer for a medium-sized dog to a large-sized dog, nor disclosing measures in order to save energy by improving thermal efficiency.

Further, the following invention is proposed for a pet dryer in which a drying module is installed in a box body.

Japanese Utility Model Registration No. 3166426 (Patent Document 2) has a purpose of providing a "pet dryer" which can dry the entire body of a pet which is finished with shower and entered into an accommodation space, can conveniently dry the pet speedily. The proposed pet dryer is characterized by including a box body and a drying module. The accommodation space is formed so that a door is provided inside the box body. An exhaust duct for discharging and sending air outside is provided on one side of the accommodation space. The drying module is attached to the box body. An accommodation chamber is formed for accommodating a dryer implement, and an air-intake duct for taking external air inside is provided to a side edge of the accommodation chamber. An exit through which thermal energy is discharged is formed on one side of the dryer implement, and a control valve for changing the discharging direction is connected with the exit. An extension tube for allowing the drying outside the box body is connected with one side of the control valve, and an introducing pipe communicating with the accommodation space of the box body is provided on the other side.

However, the pet dryer is not unitized or modularized in a form in which the box body and the drying module are easily assembled and disassembled. Further, the utility model registration does not disclose a structure for simultaneously drying two dogs, a small-sized dog and a medium-sized dog, nor disclosing a structure for extending from the pet dryer for a medium-sized dog to a large-sized dog.

REFERENCE DOCUMENTS OF CONVENTION ART

Patent Document

Patent Document 1 Japanese Utility Model Registration No. 3165766
Patent Document 2 Japanese Utility Model Registration No. 3166426

DISCLOSURE OF THE INVENTION

Problems to be Solved by the Invention

The purpose of the present invention is to provide a box-type pet dryer which uses a unitization and modularization technique of an electric control device and a casing to achieve rationalization of a production process, rationalization of service and maintenance, cost reduction in extension of equipment, improvement in environment, measures to save energy, etc.

SUMMARY OF THE INVENTION

In order to solve the above-described situations, the invention described in claim 1 is a box-type pet dryer, including an electric control device and a casing. The electric control device has a function to adjust air volume and temperature by a temperature sensor and control a rotational speed of a fan motor by a humidity sensor. A partition plate is provided to divide between the electric control device and a side opening part of the casing. A filtered window is attached to a substantially center part of the partition plate. A warm air discharge port is formed in a lower part of the partition plate. A door for taking a pet in and out is attached to a front surface of the casing. A side plate is attached to a side surface opposite from the side opening part. The box-type pet dryer is configured to be easily assemblable and disassemblable by coupling the electric control device and the casing at the side opening part.

In the invention described in claim 2, the box-type pet dryer may have a structure in which another extension casing is coupled to the casing described in claim 1, on a side opposite from the side opening part. A partitioning part dividing the inside of the casing may be rotatably attached to a coupling part between the casing and the extension casing.

In the invention described in claim 3, the electric control device described in claim 1 or 2 may include an axial-flow fan configured to forcibly exhaust part of air inside the casing, and the electric control device drives the axial-flow fan when exceeding a predetermined humidity based on the detection of the humidity sensor.

In the invention described in claim 4, an air-intake port through which external air is taken in may be formed in the side plate described in claims 1 to 3.

In the invention described in claim 5, the partition plate of claims 1 to 4 may be made of insulating material.

In the invention described in claim 6, the casing described in claims 1 to 5 may be made of synthetic resin and painted in a whitish color on an inside surface and an outside surface of each part of the casing.

In the invention described in claim 7, the door described in claims 1 to 6 may be provided with a device configured to simultaneously lock an upper side and a lower side of the door by vertically operating a lever.

In the invention described in claim 8, a protruding member configured to prevent adhesion between a pet and an inner wall surface during a drying operation, may be attached to the side plate inside the casing and a surface opposite from the door, which are described in claims 1 to 7.

In the invention described in claim 9, a box-shaped tray configured to receive pet's urine etc. and a duckboard configured to support a pet may be installed in a lower part of the casing described in claims 1 to 8. Rectangular holes for a warm air passage may be formed in opposing rising parts of the tray, and one of rectangular holes through which warm air is discharged may be formed smaller than the other rectangular hole into which warm air blows.

In the invention described in claim 10, a wind direction control piece configured to guide warm air upward may be disposed below the duckboard supporting the pet on the tray described in claim 9, or a wind direction control projection configured to guide warm air upward may be provided on the bottom of the tray.

In the invention described in claim 11, the duckboard described in claim 9 may have a structure to allow the warm air to pass therethrough upwardly, and the wind direction control piece may be disposed below the duckboard.

Effects of the Invention

As described above, according to the present invention, the low-cost, easily-assemblable box-type pet dryer can be provided by unitizing the electric control device and the casing, and by modularizing the casing. That is, since the pet dryer is unitized and modularized, even if any failures occur at customers, only the failed part can be easily separated and returned. Therefore, the sipping cost can be significantly reduced. Moreover, after purchasing the product which is comprised of an electric control device and a single casing, if he/she wants to use it to simultaneously dry two dogs, a small-sized dog and a medium-sized dog, or convert it for from a medium-sized dog to a large-sized dog, he/she only purchases another extension casing and couples this extension casing to the original casing. Therefore, he/she can easily extend the casing. Further, the box-type pet dryer can be provided, in which energy-saving measures are also possible, by using synthetic resin for the material of the casing in addition to the consideration of the trimmer's health by preventing hair scattering inside the casing from spreading in the room.

MODES FOR CARRYING OUT THE INVENTION

Figure 1:
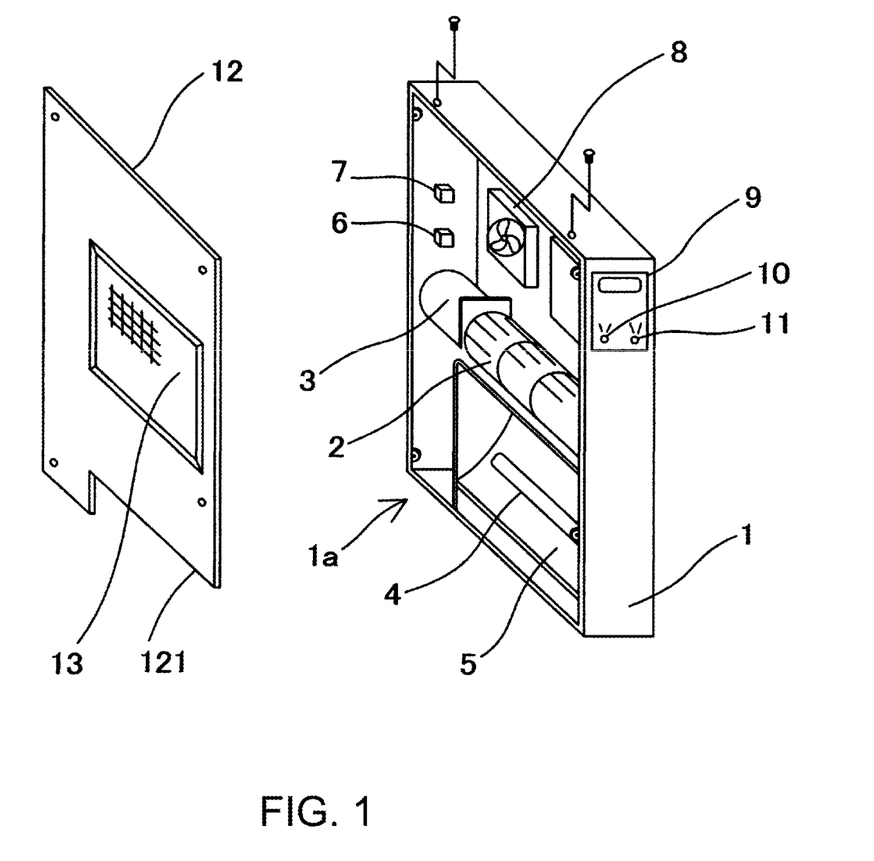
FIG. 1 is a perspective view illustrating one example of an electric control device of a box-type pet dryer of the present invention.
Figure 2:
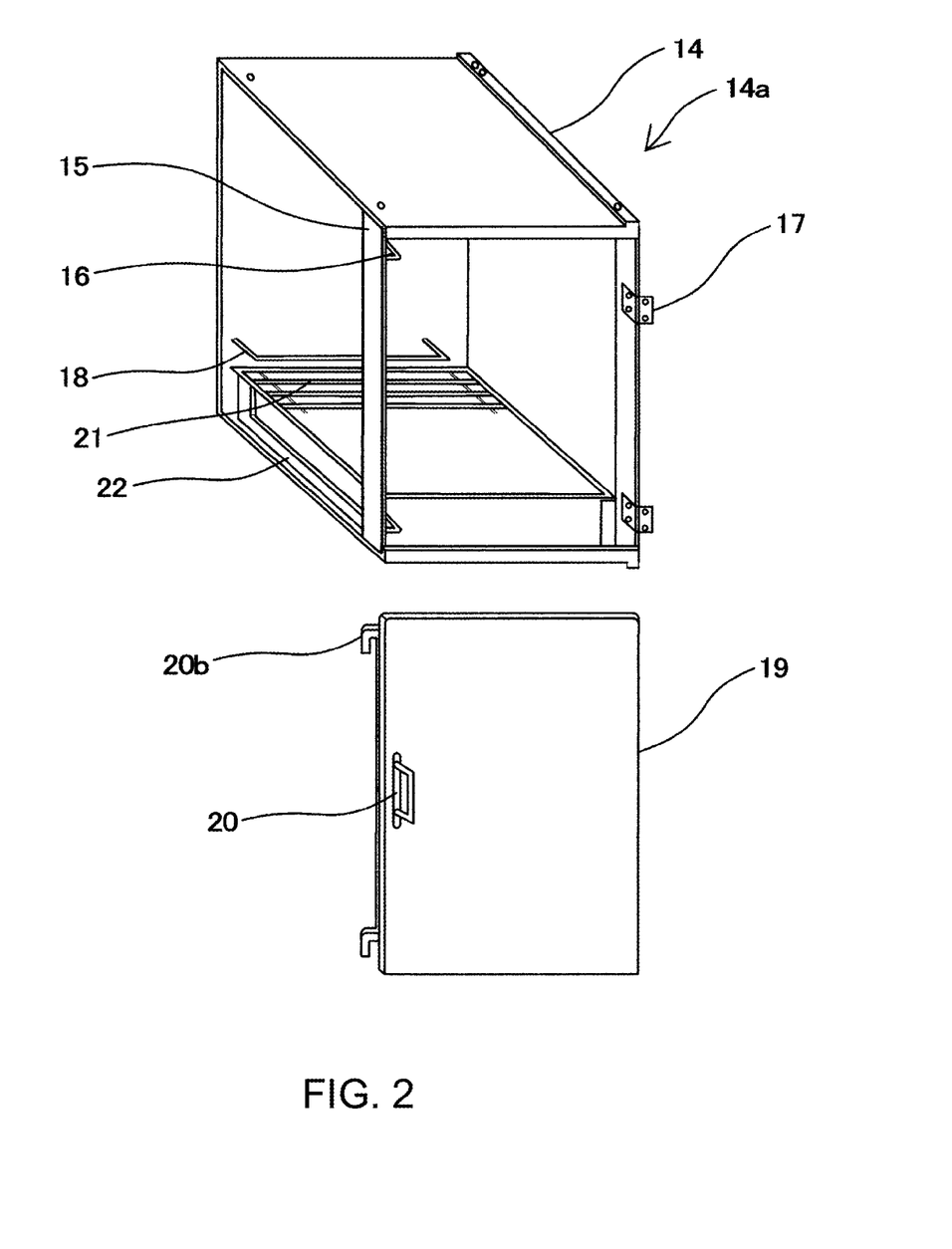
FIG. 2 is a perspective view illustrating one example of a casing of the box-type pet dryer of the present invention.
Figure 3:
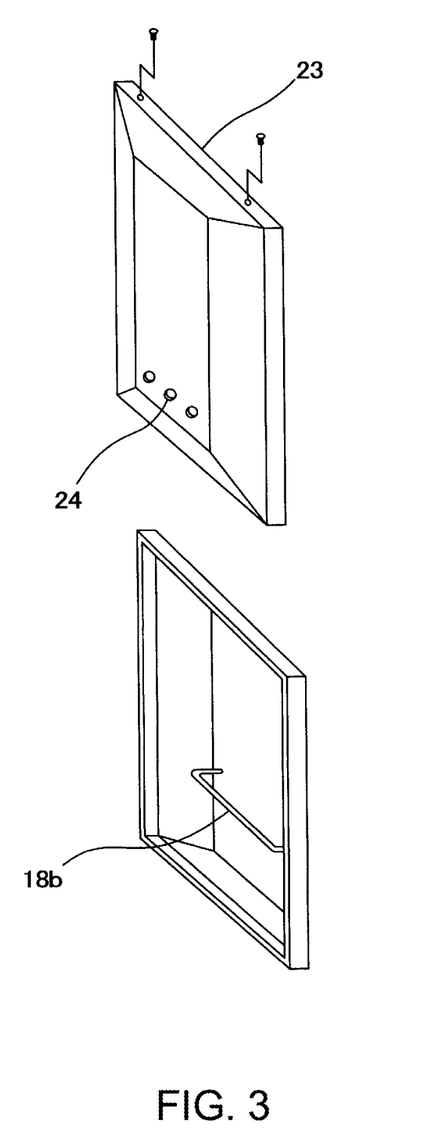
FIG. 3 is a perspective view illustrating one example of a side plate to be attached to a side surface of the casing of the present invention.

Hereinafter, one embodiment of the present invention is described with reference to the accompanying drawings. FIG. 1 is a perspective view illustrating one example of an electric control device, FIG. 2 is a perspective view illustrating one example of a casing, and FIG. 3 is a perspective view illustrating one example of a side plate to be attached to a side surface of the casing. Note that each configuration of the box-type pet dryer of the present invention is not limited to the following embodiments and can be suitably varied according to situations of use.

As illustrated in FIG. 1, a fan 2 for feeding warm air into a casing 14 described later, a motor 3 for driving the fan, a heater 4, and a reflector 5 for allowing efficient thermal conversion of the heater 4 are incorporated into an electric control device 1. The electric control device 1 is also provided with a temperature sensor 6 and a humidity sensor 7 therein, which adjust air volume and temperature, respectively, and a rotational speed of the motor 3 is controlled by the electronic circuit incorporated in an operator control panel 9. The electric control device 1 is also provided with an axial-flow fan 8 therein, which forcibly exhausts part of air inside the casing 14. When exceeding a predetermined humidity (80%) based on a detection of the humidity sensor 7, the axial-flow fan 8 is driven to prevent a drop in thermal efficiency, as compared with a case where forced ventilation is carried out from the beginning Note that setting of the predetermined humidity can be changed suitably according to temperature conditions inside the casing 14.

A side opening part 1a of the electric control device 1 is provided with a partition plate 12 which divides between itself and a side opening part 14a of the casing 14 to be coupled with fasteners, such as screws. A filtered window 13 for removing fallen hair is attached to a substantially center part of the partition plate 12. Since the axial-flow fan 8 is installed at a location behind the filtered window 13, the work place environment is improved because of the exhaust air not including dog hair. A warm air discharge port 121 is formed in a lower part of the partition plate 12. The partition plate 12 is suitably made of insulation material in order to reduce radiation loss and prevent electric shocks of pets.

As illustrated in FIG. 2, a door 19 is rotatably attached with hinges 17 to a front surface of the casing 14, for taking a pet in and out. The casing 14 is suitably made of synthetic resin, and inside and outside surfaces of each part are painted in a whitish color, in order to reduce radiation loss. A side plate 23 illustrated in FIG. 3 is attached by fasteners, such as screws, to a side surface opposite from the side opening part 14a to be coupled to the electric control device 1 described above. An air-intake port 24 through which external air is taken in is disposed in the side plate 23. External air with low absolute humidity is taken in from the air-intake port 24 (the ambient temperature is about 20° C., and it becomes about 40° C. when a drying room is saturated) to increase drying speed and prevent the pet from stifling during the drying operation.

Figure 4:
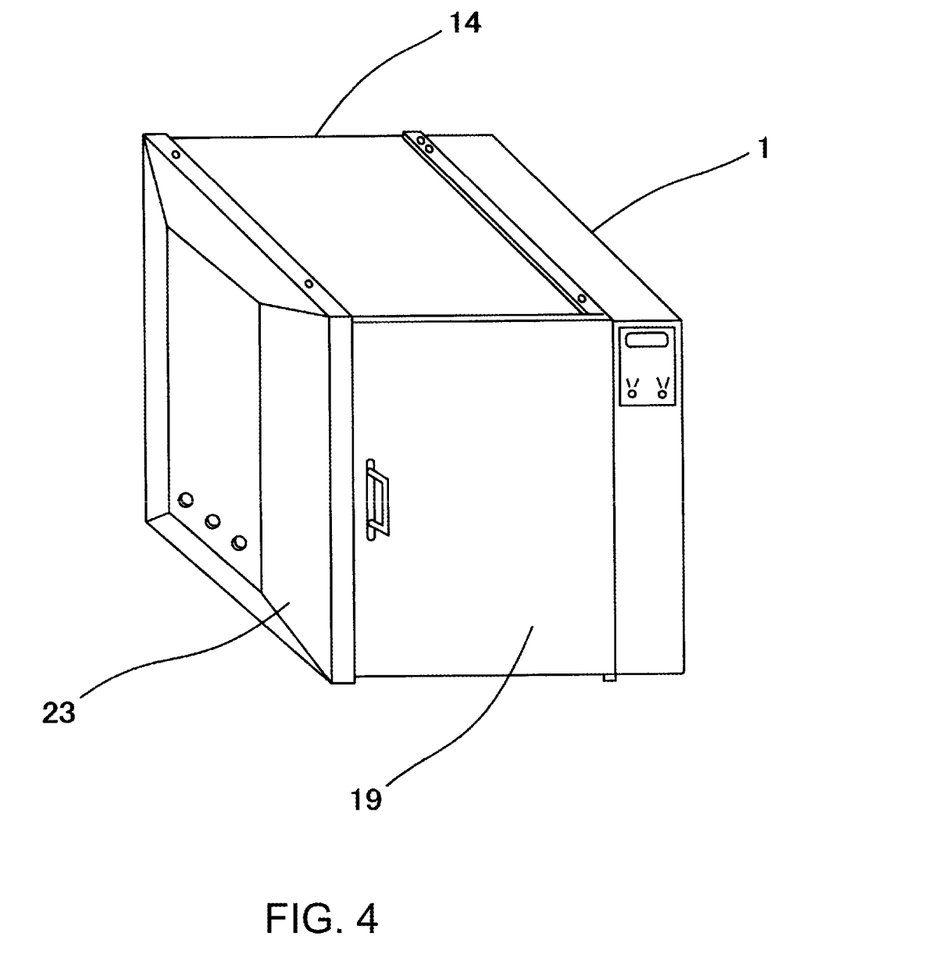
FIG. 4 is a perspective view illustrating one example of the box-type pet dryer of the present invention after assembly is completed.

Thus, the box-type pet dryer of the present invention is characterized in that it is easily assembled and disassembled by unitizing the electric control device 1, the casing 14, and the side plate 23, and respectively coupling them by fasteners, such as screws (see FIG. 4).

As illustrated in FIG. 2, the door 19 is provided with a locking mechanism which can be dropped into lock angle members 16 provided to the casing 14 in order to keep a pet inside the casing 14. Thus, after raising a lock lever 20 upwardly and shutting the door 19, the lock lever 20 returns to the original position by its own weight to simultaneously lock upper and lower sides of the door 19. Note that the locking mechanism is not limited to the above-described structure, and can have any structure as long as it is easily lockable by a lever operation.

As illustrated in FIG. 2, a protruding member 18, such as a C-shaped member, which prevents adhesion between a pet and an inner wall surface during the drying operation, is attached to a surface opposite from the door 19, inside the casing 14. The protruding member 18b, such as a similar C-shaped member, is attached to the side plate 23 (see FIG. 3). Thus, warm air can be uniformly distributed throughout a pet.

As illustrated in FIG. 2, a box-shaped tray 22 for receiving pet's urine etc., and a duckboard 21 for supporting a pet, are installed on a lower surface of the casing 14. Thus, a dog can be separated from excrement, and a passage through which warm air flows is secured underneath the duckboard 21 so that the warm air blown upward from the part below the duckboard 21 can be spread inside the casing 14 to dry the pet.

Figure 7:
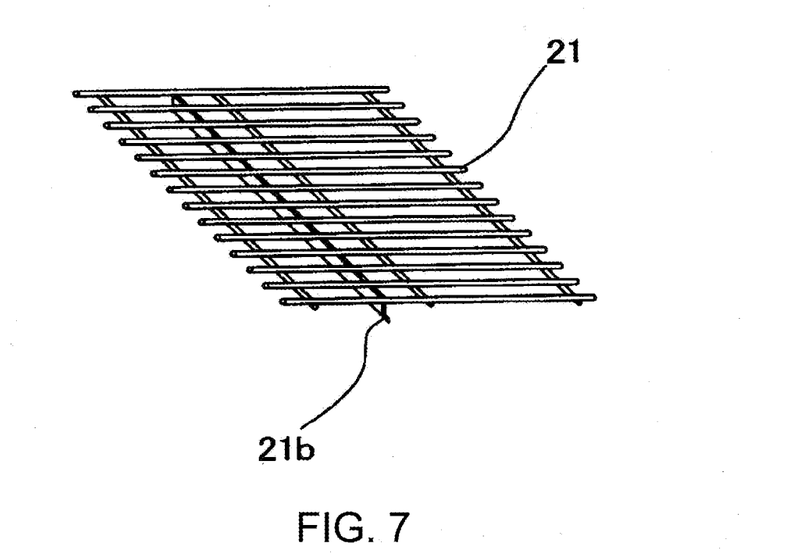
FIG. 7 is a perspective view illustrating one example of a duckboard of the present invention.
Figure 8:
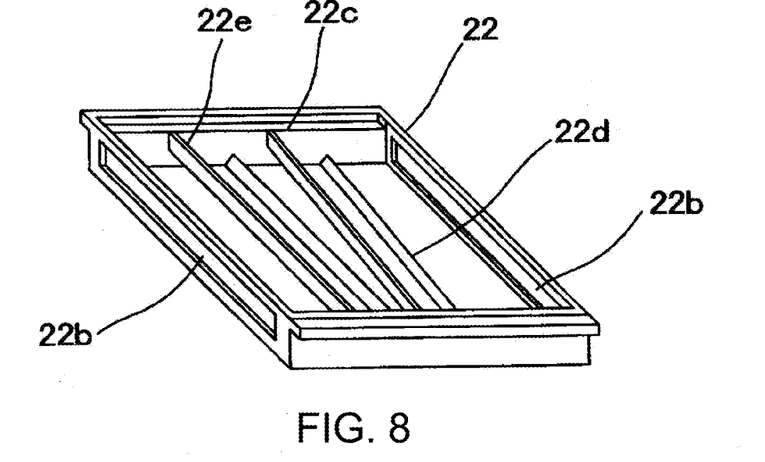
FIG. 8 is a perspective view illustrating one example of a tray of the present invention.
Figure 9:
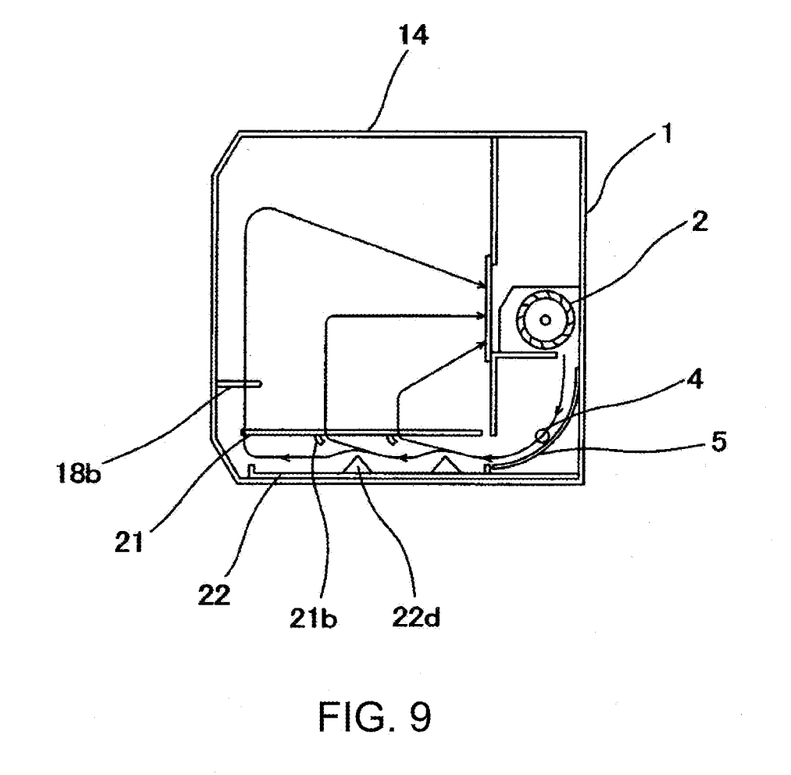
FIG. 9 is a diagram illustrating a wind flow of the box-type pet dryer of FIG. 4.

The duckboard 21 has a structure, as illustrated in FIG. 7, in which warm air can also pass therethrough upwardly, and a wind direction control piece 21b, such as an angle member, is disposed on a lower surface of the duckboard 21. The structure of the tray 22 is set so that, as illustrated in FIG. 8, a rectangular hole 22b for warm air passage is formed in opposing rising parts of the tray 22, respectively, and one of the rectangular holes through which warm air is discharged is smaller than the other rectangular hole through which warm air enters. Wind direction control pieces 22e, such as angle members, for guiding warm air upward are disposed below the duckboard 21 which supports a pet on the tray 22, or wind direction control projections 22d, such as protrusions having slopes for guiding warm air upward are provided on the bottom of the tray 22. Thus, as illustrated in FIG. 9, since the blown warm air is guided upward by the wind direction control pieces 21b and the wind direction control projections 22d and spread inside the casing 14, the warm air blown upward from a space below the duckboard 21 hits uniformly over the pet to prevent the non-uniform drying of the pet.

Next, in addition to the unitization of the electric control device 1 and the casing 14 described above, the box-type pet dryer of the present invention is characterized by modularizing the casing 14.

Figure 5:
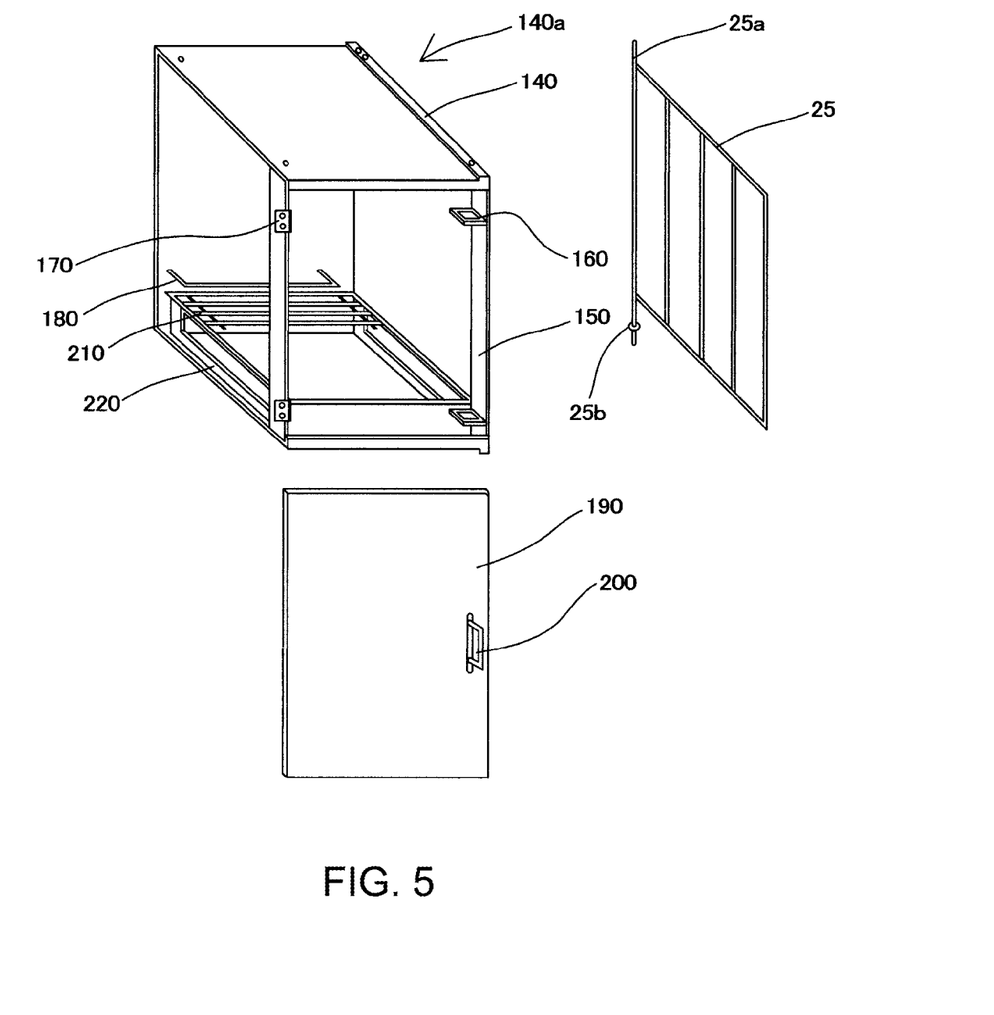
FIG. 5 is a perspective view illustrating one example of an extension casing of the present invention.
Figure 6:
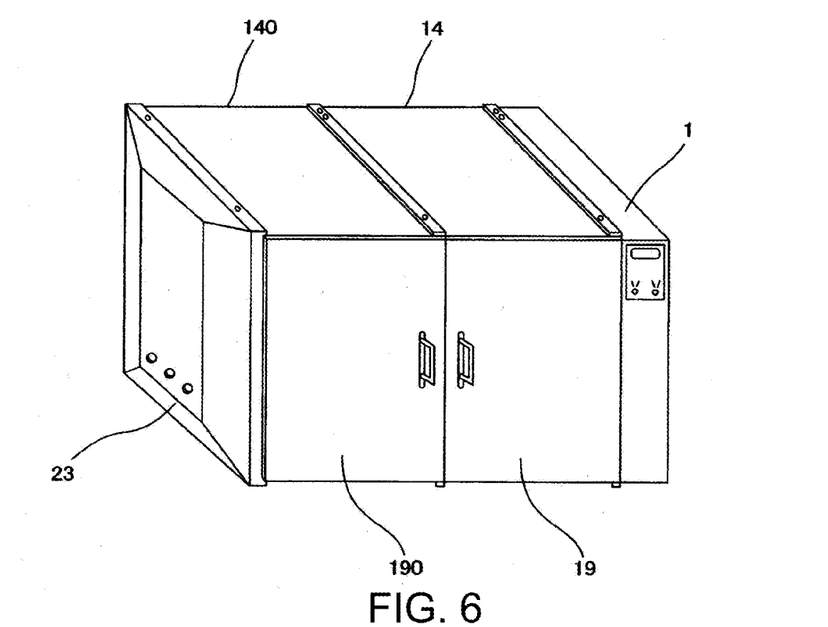
FIG. 6 is a perspective view illustrating one example of the box-type pet dryer of the present invention after the extended assembly is completed.

FIG. 5 is a perspective view illustrating one example of an extension casing of the present invention. An extension casing 140 is to connect with a side surface opposite from the side opening part 14a of the casing 14 described above. That is, the box-type pet dryer comprised of the electric control device 1 and the single casing 14 is easily extensible by coupling another extension casing 140 by fasteners, such as screws (see FIG. 6).

As illustrated in FIG. 5, a door 190 is rotatably attached to the front surface of the casing 140 with hinges 170, for taking a pet in and out of the casing 140, similar to the casing 14. The casing 140 is suitably made of synthetic resin, and inside and outside surfaces of each part are painted in a whitish color, in order to reduce radiation loss. A side plate 23 illustrated in FIG. 3 is attached by fasteners, such as screws, to a side surface opposite from the side opening part 140a to be coupled to the casing 14, similar to the casing 14.

A partitioning part 25 dividing the inside of the casing 14 and the inside of the casing 140 is rotatably attached at a coupling part of the casing 140 and the casing 14. Thus, when it is divided by the partitioning part 25 (a state in which the partitioning part 25 is fixed at the center), two dogs, a small-sized dog and a medium-sized dog, can be dried simultaneously. When the partitioning part 25 is removed (a state in which the partitioning part 25 is rotated to either one of the left and right, and is fixed along an inner wall surface), it can be used for a large-sized dog because a large volume is secured.

As illustrated in FIG. 5, the door 190 is provided with a locking mechanism which can be dropped into lock angle members 160 provided to the casing 140 in order to keep a pet from inside the casing 140, similar to the door 19. Thus, after raising a lock lever 200 upwardly and shutting the door 190, the lock lever 200 returns to the original position by its own weight to simultaneously lock the upper and lower sides of the door 190. Note that the locking mechanism is not limited to the above-described structure, and can have any structure as long as it is easily lockable by a lever operation.

As illustrated in FIG. 5, a protruding member 180, such as a C-shaped member, which prevents adhesion between a pet and an inner wall surface during the drying operation, is attached to a surface opposite from the door 190, inside the casing 140. The protruding member 18b, such as a similar C-shaped member, is attached to the side plate 23 (see FIG. 3). Thus, warm air can be uniformly distributed throughout a pet.

As illustrated in FIG. 5, a box-shaped tray 220 for receiving pet's urine etc., and a duckboard 210 for supporting a pet, are installed on a lower surface of the casing 140. Thus, a dog can be separated from excrement, and a passage through which warm air flows is secured underneath the duckboard 210 so that the warm air blown upward from the part below the duckboard 210 can be spread inside the casing 140 to dry the pet. Note that the structures of the duckboard 210 and the tray 220 are similar to those of the duckboard 21 and the tray 22 described above (see FIGS. 7 and 8).

Figure 10:
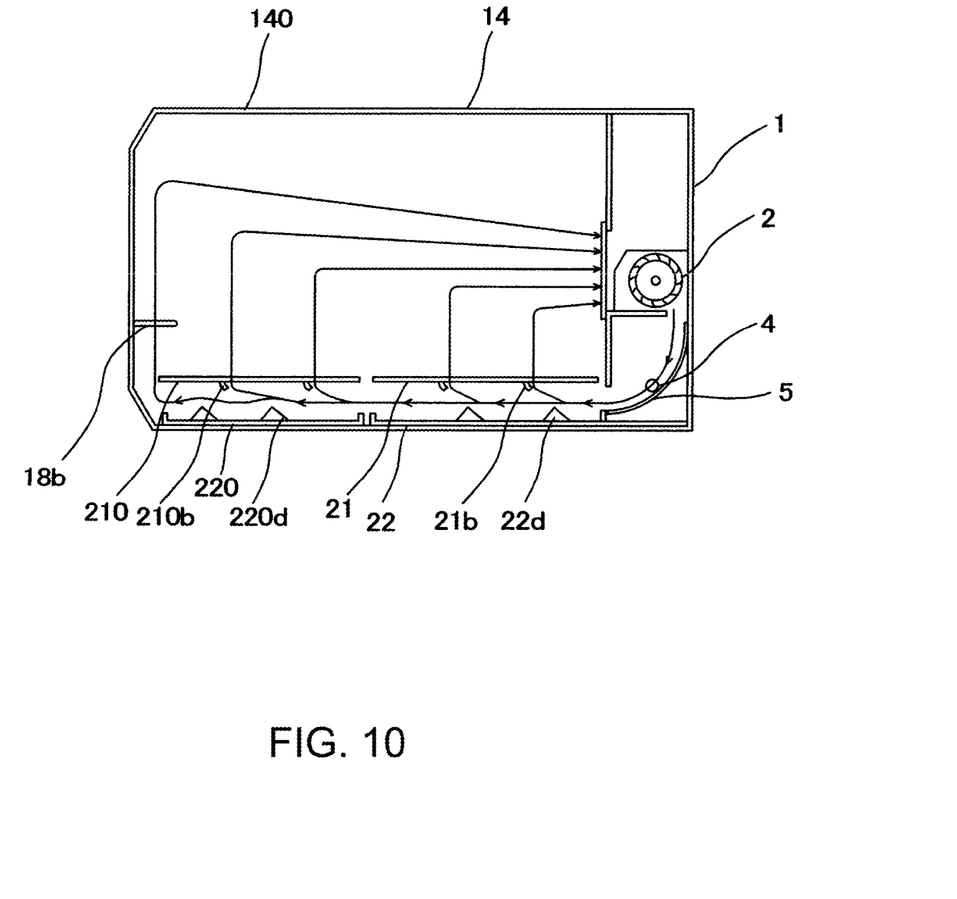
FIG. 10 is a diagram illustrating a wind flow of the box-type pet dryer of FIG. 6.

As illustrated in FIG. 10, when the casing 14 is extended by coupling to the casing 140, since blown warm air flows under the duckboards 21 and 210, and is guided upward by the wind direction control pieces 21b and 210b and the wind direction control projections 22d and 220b so that the warm air is spread inside the casings 14 and 140, the warm air blown upward from spaces below the duckboards 21 and 210 hits uniformly over the pet to prevent the non-uniform drying of the pet.

DESCRIPTION OF REFERENCE NUMERALS

1 Electric Control Device
1a Side Opening Part
2 Ventilation Fan
3 Motor
4 Heater
5 Reflector
6 Temperature Sensor
7 Humidity Sensor
8 Axial-flow Fan
9 Operator Control Panel
10 Air Volume Switch
11 Temperature Setting Switch
12 Partition Plate
121 Warm Air Discharge Port
13 Filtered Window
14 Casing
14a Side Opening Part
140 Extension Casing
140a Side Opening Part
15 Pillar
150 Pillar
16 Lock Angle Member
160 Lock Angle Member
17 Hinge
170 Hinge
18 Protruding Member
18b Protruding Member
180 Protruding Member
19 Door
190 Door
20 Lock Lever
20b Lock Bar
200 Lock Lever
21 Duckboard
21b Wind Direction Control Piece
210 Duckboard
210b Wind Direction Control Piece
22 Tray
22b Warm Air Passage Rectangular Hole
22c Duckboard Receiving Part
22d Wind Direction Control Projection
22e Wind Direction Control Piece
220 Tray
220d Wind Direction Control Projection
23 Side Plate
24 Air-intake Port
25 Partitioning Part
25a Rotational Shaft
25b Vertically Fixing Washer

The invention claimed is:

1. A modular box-type pet dryer for drying wet pets comprising an electric control device and a casing,
wherein the casing has a top wall, a bottom wall, a first side, and a second side, and a chamber that is sized to receive a first pet is defined between the sides and the walls of the casing; wherein a side opening is formed in each of the first and second sides of the casing;
wherein the electric control device adjusts air volume and temperature within the chamber of the casing by a temperature sensor and controls a rotational speed of a fan motor by a humidity sensor,
wherein a partition plate is configured to be located between and divide the electric control device and the side opening in first side of the casing,
wherein a filtered window is attached to a substantially center part of the partition plate,
wherein a warm air discharge port is formed in a lower part of the partition plate,
wherein a door for taking a pet in and out of the chamber is attached to a front surface of the casing,
wherein a side plate is removably attached to the second side of the casing opposite from the partition plate, and
wherein the box-type pet dryer is configured to be easily assemblable and disassemblable by removably coupling the electric control device and the casing at the side opening part;
wherein an extension casing is removably coupled to the side opening in first side of the casing in order to extend the size of the pet dryer;
wherein the extension casing has a to wall, a bottom wall, a first side, and a second side, and a chamber that is sized to receive a second pet is defined between the sides and the walls of the extension casing; wherein a side opening is formed in each of the first and second sides of the extension casing;
wherein, when the extension casing is attached to the first casing, the chambers of the casing and extension casing are combined to define one enlarged chamber that is larger than each of the chambers individually so that a third pet that is larger than the first and second pets can be stored and dried within the pet dryer.

2. The modular box-type pet dryer of claim 1, wherein a partitioning part dividing the inside of the casing is rotatably attached to a coupling part between the casing and the extension casing.

3. The modular box-type pet dryer of claim 1, wherein the electric control device includes an axial-flow fan configured to forcibly exhaust part of air inside the casing, and the electric control device drives the axial-flow fan when exceeding a predetermined humidity based on the detection of the humidity sensor.

4. The modular box-type pet dryer of claim 1, wherein an air-intake port through which external air is taken in is formed in the side plate.

5. The modular box-type pet dryer of claim 1, wherein the partition plate is made of insulating material.

6. The modular box-type pet dryer of claim 1, wherein the casing is made of synthetic resin and painted in a whitish color on an inside surface and an outside surface of each part of the casing.

7. The modular box-type pet dryer of claim 1, wherein the door is provided with a device configured to simultaneously lock an upper side and a lower side of the door by vertically operating a lever.

8. The modular box-type pet dryer of claim 1, wherein a protruding member configured to prevent adhesion between a pet and an inner wall surface during a drying operation, is attached to the side plate inside the casing and a surface opposite from the door.

9. The modular box-type pet dryer of claim 1, wherein a box-shaped tray configured to receive pet's urine and a duckboard configured to support a pet are installed in a lower part of the casing, and wherein the rectangular holes for a warm air passage are formed in opposing rising parts of the tray, and one of the rectangular holes through which warm air is discharged is smaller than another rectangular hole into which warm air blows.

10. The modular box-type pet dryer of claim 9, wherein a wind direction control piece configured to guide warm air upward is disposed below the duckboard supporting the pet on the tray, or a wind direction control projection configured to guide warm air upward is provided on the bottom of the tray.

11. The modular box-type pet dryer of claim 10, wherein the duckboard has a structure to allow the warm air to pass therethrough upwardly, and the wind direction control piece is disposed below the duckboard.

* * * * *